ns011540338B2

(12) United States Patent
Rist et al.

(10) Patent No.: US 11,540,338 B2
(45) Date of Patent: *Dec. 27, 2022

(54) METHOD FOR ESTABLISHING A TELECOMMUNICATION CONNECTION IN A TELECOMMUNICATION SYSTEM AND TELECOMMUNICATION SYSTEM

(71) Applicant: RINGCENTRAL, INC., Belmont, CA (US)

(72) Inventors: Claus Rist, Bochum (DE); Michael Willmann, Witten (DE); Martin Glaser, Bergkamen (DE); Michael Volkmann, Herdecke (DE)

(73) Assignee: RingCentral, Inc., Belmont, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 16/951,390

(22) Filed: Nov. 18, 2020

(65) Prior Publication Data

US 2021/0076432 A1    Mar. 11, 2021

Related U.S. Application Data

(63) Continuation of application No. 16/375,279, filed on Apr. 4, 2019, now Pat. No. 10,873,981, which is a (Continued)

(30) Foreign Application Priority Data

Jun. 18, 2015    (DE) .............................. 102015007857

(51) Int. Cl.
  *H04W 76/11*     (2018.01)
  *H04L 65/1046*   (2022.01)
  (Continued)

(52) U.S. Cl.
  CPC ......... *H04W 76/11* (2018.02); *H04L 65/1046* (2013.01); *H04L 65/1053* (2013.01);
  (Continued)

(58) Field of Classification Search
  None
  See application file for complete search history.

(56) References Cited

U.S. PATENT DOCUMENTS 7,492,887 B1     2/2009  Stumer et al.
8,467,514 B1 *   6/2013  Makhmudov ..... H04M 3/42374
                                                         379/201.1
(Continued)

FOREIGN PATENT DOCUMENTS

CN     1019899981 A    3/2011
CN     102804820 A     11/2012
(Continued)

*Primary Examiner* — Ajit Patel
*Assistant Examiner* — Pamit Kaur
(74) *Attorney, Agent, or Firm* — Finnegan, Henderson, Farabow, Garrett & Dunner, LLP

(57) ABSTRACT

In a telecommunication system comprising multiple switching nodes (10, 20, 30) having a respective local server (C1, C2, C3) and associated terminals (D1, D2, D3, D4) located within a network and a central DSS server (DSS) for controlling the telecommunication system by using a general switching protocol, the terminals (D1, D2, D3, D4) of a switching node (10, 20, 30) are controlled by the local server (C1, C2, C3) under a local protocol comprising control commands for node-internal call pickup. The pickup of a call directed from a third terminal (D4) to a first terminal (D3) assigned to a first switching node (10) through a second terminal (D1) assigned to another, second switching node (20) occurs across nodes by using the general switching protocol through transferring the control commands provided in the local protocol for call pickup to the general switching protocol and providing them across nodes through
(Continued)

a) Call b) Pickup the central DSS server (DSS) to the multiple switching nodes (10, 20, 30) located within the network, and converting the registration of a terminal (D1, D2, D3, D4) for call pickup provided in the local protocol to the general switching protocol and forwarding it to the central DSS server.

19 Claims, 4 Drawing Sheets

Related U.S. Application Data continuation of application No. 15/177,618, filed on Jun. 9, 2016, now abandoned.

(51) Int. Cl.
| | |
|---|---|
| *H04L 65/1053* | (2022.01) |
| *H04L 65/1073* | (2022.01) |
| *H04L 65/1096* | (2022.01) |
| *H04L 65/1059* | (2022.01) |
| *H04W 60/02* | (2009.01) |
| *H04W 72/04* | (2009.01) |
| *H04W 80/10* | (2009.01) |
| *H04W 88/12* | (2009.01) |

(52) U.S. Cl.
CPC ...... *H04L 65/1059* (2013.01); *H04L 65/1073* (2013.01); *H04L 65/1096* (2013.01); *H04W 60/02* (2013.01); *H04W 72/0406* (2013.01); *H04W 80/10* (2013.01); *H04W 88/12* (2013.01)

(56) References Cited

U.S. PATENT DOCUMENTS

| | | | |
|---|---|---|---|
| 10,873,981 B2 * | 12/2020 | Rist | H04W 60/02 |
| 2004/0202300 A1 * | 10/2004 | Cooper | H04M 1/72469 379/201.01 |
| 2006/0018453 A1 | 1/2006 | Zhakov et al. | |
| 2006/0274678 A1 * | 12/2006 | Holloway | H04M 3/42272 370/260 |
| 2010/0086118 A1 * | 4/2010 | Yang | H04M 3/42314 379/202.01 |
| 2011/0026517 A1 * | 2/2011 | Capuozzo | H04L 65/104 715/764 |

FOREIGN PATENT DOCUMENTS

| | | | | |
|---|---|---|---|---|
| CN | 104243290 A | | 12/2014 | |
| DE | 69932795 T2 | | 12/2006 | |
| DE | 102012223407 A1 | | 6/2014 | |
| WO | WO-2013142284 A1 * | | 9/2013 | C12M 21/02 |

* cited by examiner

METHOD FOR ESTABLISHING A TELECOMMUNICATION CONNECTION IN A TELECOMMUNICATION SYSTEM AND TELECOMMUNICATION SYSTEM

CROSS-REFERENCE TO RELATED APPLICATIONS

The present application is a continuation application of U.S. patent application Ser. No. 16/375,279, which is a continuation of U.S. patent application Ser. No. 15/177,618, which claims priority to German Patent Application No. DE 102015007857.7, filed on Jun. 18, 2015.

FIELD OF INVENTION

The present invention concerns a method for establishing a telecommunication connection in a telecommunication system and in particular to the establishment of a telecommunication connection in a telecommunication system by call pickup.

BACKGROUND OF THE INVENTION

Modern telecommunication systems, such as IP-based systems, comprise a network and multiple switching nodes, each having a respective local server and associated terminals arranged in the network, as well as a central DSS server for controlling the telecommunication system using a general switching protocol. The "Session Initiation Protocol" (SIP) is a frequently used protocol in IP telephony for establishing a communication session between two or more participants. The protocol is specified in RFC 3261 as well as RFC 4235 and RFC 5359, among others. In connection with the present invention, express reference is made to the RFC 3261 standard and the updates named therein, which are considered known and whose disclosure is thus part of the disclosure of the present application. However, it shall be emphasized that in addition to telephony, sessions of any kind can be managed using SIP. The payload of a session, i.e., the actual data streams that are to be transferred, can be any kind of data streams that can be transmitted via a network.

SIP is used to unify or negotiate the communication modalities of a session. The actual data of the communication have to be exchanged via other protocols suitable for this task. Media negotiation is thus not an actual component of SIP, but rather is accomplished by embedding an additional protocol in SIP.

An additional protocol, which in connection with the present invention and by reference becomes an express component of the disclosure of the present application, is the "Computer-Supported Telecommunications Applications" (CSTA) protocol according to the following standards: ECMA-269 (Services for Computer-Supported Telecommunications Applications (CSTA) Phase III), ECMA-323 (XML Protocol for Computer-Supported Telecommunications Applications (CSTA) Phase III—CSTA XML) and ECMA-348 (Web Services Description Language (WSDL) for CSTA Phase III—CSTA Web Services), ECMA TR/87 (Using CSTA for SIP Phone User Agents—uaCSTA) or ISO/IEC 18051—CSTA Services [ECMA-269], ISO/IEC 18052—CSTA-Protocol [ECMA-285], ISO/IEC TR 18053—CSTA Glossary [ECMA TR/72], ISO/IEC 18056—CSTA XML [ECMA-323], ISO/IEC 25437:—WS-Session—Web Services for Applications [ECMA-366] and the following underlying standards: ECMA-217 (Architecture and Services for CSTA Phase II), ECMA-218 (application Layer Protocol (in ASN.1) for CSTA Phase II plus Protocol Implementation Conformance Statements (PICS)), ECMA-179 (Architecture and Services for CSTA Phase I), as well as ECMA-180 (Application Layer Protocol (in ASN.1) for CSTA Phase I plus Protocol Implementation Conformance Statements (PICS)). CSTA is thus a protocol specification standardized by the ECMA, which is used for data traffic between a telephone system and computer programs. However, the CSTA protocol defines the transmitted data, not the transport layer. Basic Encoding Rules (CSTA Phase I, II and III) and XML Encoding Rules (CSTA Phase III) are used for encoding the data streams.

Traditionally, only the switching states for the terminals, so-called SIP endpoints that are located inside a node, are signaled optically via LED or otherwise in telecommunication systems of the kind described here, such as phones. The prerequisite for this is that a subscriber has configured another subscriber located within the same node, e.g., on a programmable button of his SIP terminal. This is referred to as a presence-indicating BLF button (BLF=busy lamp field). The SIP endpoint stores the telephone number of the programmed other subscriber on this button.

The following switching states could be signaled at the respective programmed BLF button using the LEDs (or corresponding other elements of the user interface):
Subscriber is free: BLF button is off.
Subscriber is being called: BLF button flashes.
Subscriber is busy (e.g., on a call): BLF button is on.
Other typically possible features are:
Another subscriber can be called from the SIP endpoint by pressing a button.
A call can be picked up by a subscriber via the SIP endpoint.

Today, programming a telephone number of a subscriber located in a different node is also possible with some systems, but the switching state is not BLF-signaled, and as a consequence, further processing such as call pickup is also not possible.

Call pickup for SIP endpoints across nodes is known from US 2004/0086102 A1. With the call pickup across nodes described there, a call is directed across one or more networks, at least one of which is a data network, from a first device to a second device. To this end, information regarding the call initiation between the first device and the second device is stored, a message from a third device is received during the call initiation, where the message contains a call pickup indication. After retrieving the information concerning the call initiation between the first device and the second device, a call is established between the first device and the third device based on the retrieved information.

EP 1189406 A2 describes a distributed communication system, consisting of multiple communication devices and one central data processing unit connected to each other by a network, where a central software interface is located on the central data processing unit and where the individual local software interfaces of the distributed communication device of the communication system are presented on a parent interface using the central software interface. In this manner, the distributed communication system appears as one unit for a communication application running on the server, having a respective high number of hardware resources such as subscriber connections, outside lines and telephone numbers.

SUMMARY OF THE INVENTION

The problem addressed by the present invention is that of creating a method for establishing a telecommunication connection in a telecommunication system, as well as the telecommunication system itself that allows the establishment of a telecommunication connection across nodes through call pickup in a simple manner using already existing software resources.

The problem is solved by a method for establishing a telecommunication connection in a telecommunication system as in claim 1. The problem is furthermore solved by a telecommunication system as claimed in the claims. An additional subject matter of the invention is a non-transitory computer readable storage media containing instructions that are executable by at least one of a server and a terminal in a communications for carrying out the method The method creates a procedure for establishing a telecommunication connection in a telecommunication system comprising a network having multiple switching nodes with a respective local server and associated terminals located within the network as well as a central DSS server for controlling the telecommunication system by using a general switching protocol, wherein the subscriber terminals of a switching node are controlled by the local server using a local protocol having control commands for node-internal call pickup between terminals registered inside the node for call pickup, and wherein the telecommunication connection can be established by means of a call directed from a third terminal to a first terminal being picked up by a second terminal. According to the invention, the first terminal is assigned to a first switching node and the second terminal is assigned to another, second switching node, and the call directed from the third terminal to the first terminal is thus picked up across nodes by the second terminal using the general switching protocol, wherein the control commands provided in the local protocol for a call pickup are transferred to the general switching protocol and provided to the multiple switching nodes located within the network by the central DSS server, and wherein the registration of a subscriber provided in the local protocol for call pickup is transferred to the general switching protocol and passed on to the central DSS server. In other words, according to the invention a call pickup is possible even if the third terminal is assigned to a third switching node.

According to the invention, during the registration of the first terminal for a call pickup by the second terminal, the local server can test whether the second terminal is assigned to the same switching node, and if this is not the case, the second terminal is registered at the central DSS server using the general switching protocol.

A call directed from the third terminal to the first terminal can be captured by the central server, and when the first terminal is registered for a call pickup by the second terminal, the central server can transmit a corresponding message to the local server of the switching node of the second terminal and signal it to the second terminal.

According to one exemplary embodiment of the invention, multiple terminals are registered as a call pickup group at the central server with one single registration as the second terminal for a call pickup of a call directed from a third terminal to a first terminal.

According to another exemplary embodiment of the invention, the second terminal is registered at the central server with one single registration for picking up calls directed to multiple first terminals. This can advantageously enable a group pickup across nodes, in particular for SIP endpoints. Thus, SIP endpoints can also register across nodes for the SIP endpoint feature "Group Pickup".

According to one advantageous embodiment of the invention, CSTA is the general switching protocol, and SIP or a comparable protocol is the local switching protocol, and when a call is directed from a third terminal to a first terminal, signaling for call pickup through a second terminal occurs via CSTA across nodes to the central DSS server (DSS), and "CSTA: SetLampMode" is activated at the second terminal by the central DSS server (DSS) based on "CSTA: Delivered Events". While traditionally a certain feature must be realized via additional SIP means in the network, with each feature therefore also requiring an expanded SIP means, according to the invention the known SIP means are sufficient, i.e., they permit the use of standard SIP and instead use the multiplicity of the CSTA protocol. Advantageously, this enables simplified pickup (BLF signaling) across nodes and a call pickup through SIP endpoints via SIP-standard protocol elements using CSTA. General stimulus features can also be presented on SIP endpoints. Furthermore, it is not necessary to tunnel CSTA using SIP, so standard SIP endpoints are enabled to carry out features across nodes.

In this case, the second terminal can be a SIP endpoint and the call directed from the third terminal to a first terminal can be signaled using "SIP: Notify" and can be picked up using "SIP: Invite".

Furthermore, the invention provides a computer program product for carrying out the method according to the invention.

Furthermore, the invention creates a telecommunication system comprising a network and multiple switching nodes having a respective local server and associated terminals located within the network, as well as a central DSS server for controlling the telecommunication system by using a general switching protocol, wherein the terminals of a switching node are controlled by the local server under a local protocol having control commands for node-internal call pickup between terminals registered inside the node for call pickup, and wherein a telecommunication connection can be established through a call pickup by a second terminal of a call directed from a third terminal to a first terminal. According to the invention, the central DSS server and the multiple switching nodes located inside the network transfer the control commands provided in the local protocol for call pickup into the general switching protocol and provide them through the central DSS server to the multiple switching nodes located inside the network across nodes, wherein the registration of a terminal for call pickup intended to take place in the local protocol is transferred into the general switching protocol and passed on to the central DSS server, wherein a telecommunication connection can be signaled and established across nodes through picking up a call from a third terminal to a first terminal assigned to a first switching node, directed to a second terminal assigned to another, second switching node, wherein the telecommunication system is provided or configured to carry out the method according to the invention.

Additional advantages, features, and characteristics of the present invention are presented in the following description of advantageous embodiments with reference to the drawings. The figures show schematically:

DESCRIPTION OF THE PRESENT PREFERRED EMBODIMENTS

Figure 1:
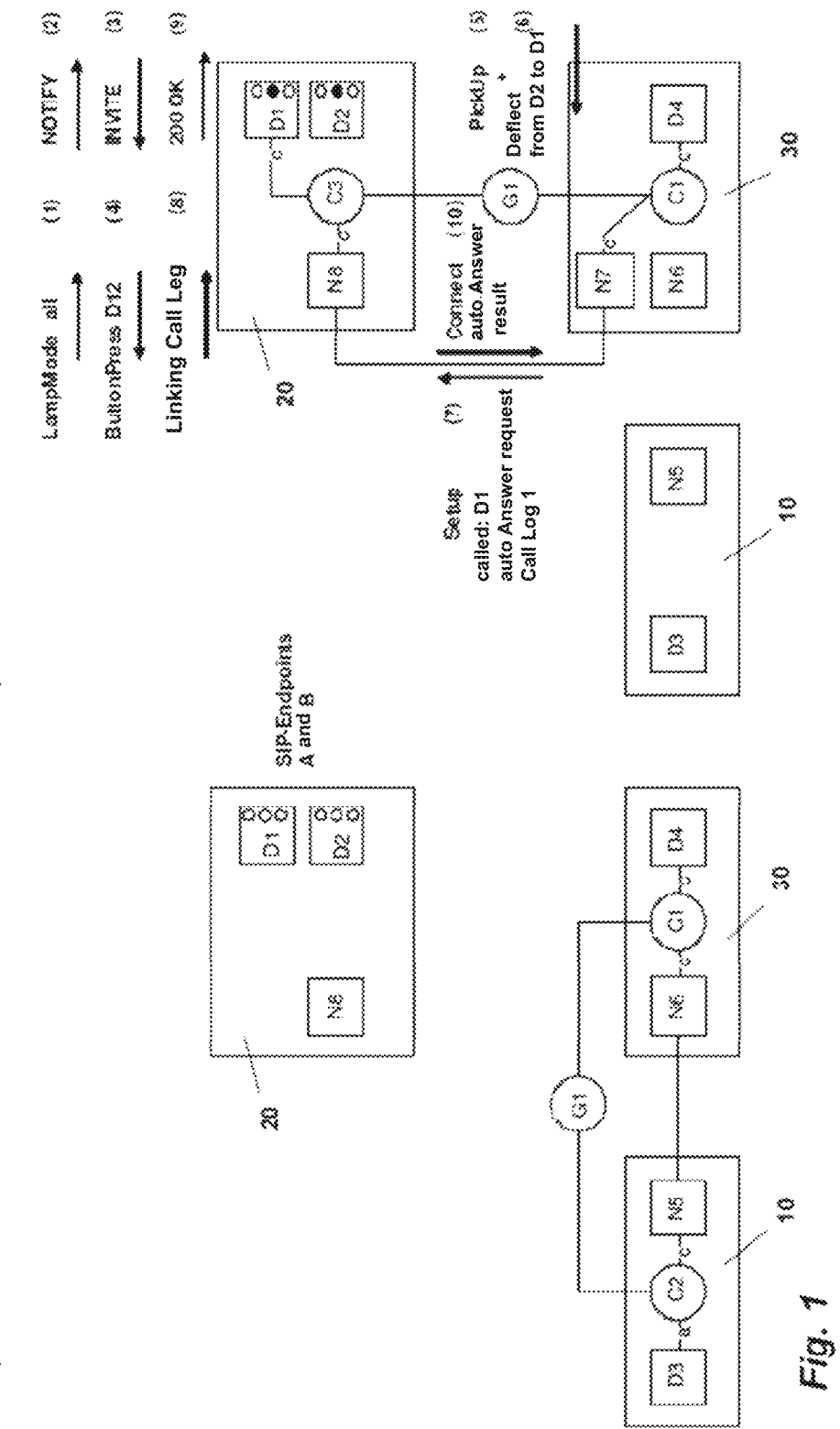
FIG. 1 is a simplified block diagram that presents schematically a network of nodes in a LAN environment for explaining a method for establishing a telecommunication connection in a telecommunication system and telecommunication system itself according to exemplary embodiments of the invention.

FIG. 1 illustrates a network of nodes in a LAN environment. Shown is a telecommunication system comprising a network and multiple switching nodes 10, 20, 30, each with a respective local server C1, C2, C3 and associated terminals D1, D2, D3, D4 arranged in the network, as well as a central DSS server DSS for controlling the telecommunication system using a general switching protocol with network trunks N5, N6, N7 and N8. The subscriber terminals (hereinafter also referred to as "terminals") D1 ... D4 of a switching node 10, 20, 30 are controlled under a local protocol by the local server C1, C2, C3. A central DSS server (Direct Station Selection server), which is responsible for providing presence information across nodes according to the description of DE 10149983 A1, is typically present in each of the nodes 10, 20, 30, but according to the invention runs preferably only in the main node specified according to the configuration. According to the CSTA Standard ECMA 269, C typically refers to Call, D to Device (also called terminal) and N to Network Trunk.

The subscriber terminals D1 ... D4 of a switching node 10, 20, 30 are controlled by a local server C1, C2, C3 under a local protocol, which includes control commands for node-internal call pickup between terminals registered within the node for picking up calls, and communicate via interfaces N5, N6, N7, N8 (in a special case, the mentioned network trunks) assigned to the respective switching node 10, 20, 30.

It shall be possible to establish a telecommunication connection inside a telecommunication system through a second terminal D1 using call pickup of a call directed from a third terminal D4 to a first terminal D3, even if the first terminal D3 and the second terminal D1 are located in different nodes.

Thus, a telecommunication connection can be established by means of call pickup by a second terminal D1 of a call directed from a third terminal D4 to a first terminal D3, wherein the first terminal D3 is assigned to a first switching node 10 and the second terminal D1 to another, second switching node 20. The call directed from the third terminal D4 to the first terminal D3 is picked up by the second terminal D1, and thus occurs across nodes by using the general switching protocol, wherein the control commands provided in the local protocol for call pickup are transferred to the general switching protocol and provided by the central DSS server DSS across nodes to switching nodes 10, 20, 30. In this case, the registration of a terminal provided in the local protocol for call pickup is transferred into the general switching protocol and passed on to the central DSS server.

A prerequisite for the functionality of the DSS server is programming the telephone number of subscriber D3 on the first switching node 10 at the SIP endpoints D1 and D2 in the second switching node 20. If the switching state changes for subscriber D3, for example by lifting the receiver, a continually lit BLF of the SIP endpoints D1 and D2 is required and needs to be signaled across nodes.

According to one exemplary embodiment, the following signaling modes are possible for telephony:
Subscriber is free→BLF is off
Subscriber is being called→BLF flashes
Subscriber is busy (e.g., is on a call)→BLF is on.

If the subscriber D3 on the first switching node 10 is called, the call can now be picked up from inside the network by one of the SIP endpoints D1 or D2 in the second switching node 20.

According to the CSTA Standard ECMA 269, C1, C2 and C3 are aiding in the local connection of the devices (terminals) Dn and the network trunks Nn.

Figure 2:
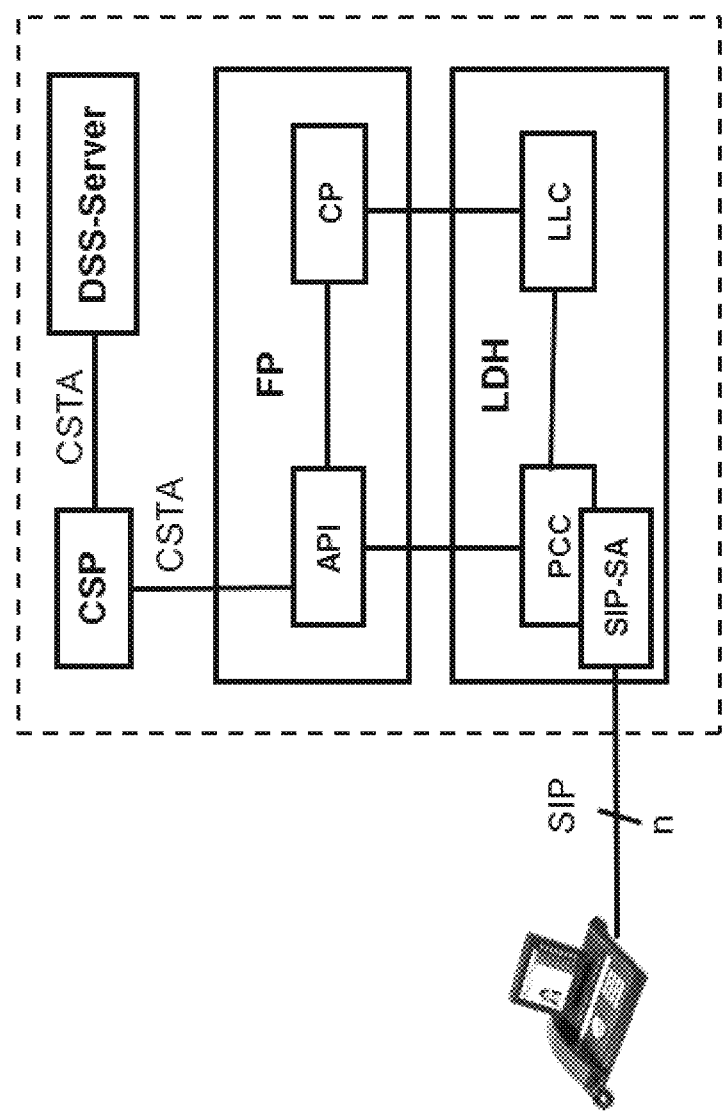
FIG. 2 is a simplified block diagram that presents schematically the OSBiz (OpenScape Business) system components that are essentially involved in establishing a telecommunication connection in a telecommunication system and the telecommunication system itself according to an exemplary embodiment of the invention.

FIG. 2 shows an overview of the involved OSBiz (OpenScape Business) system components according to one exemplary embodiment of a method for establishing a telecommunication connection in a telecommunication system and the telecommunication system itself. According to one exemplary embodiment, the general switching protocol is CSTA and the local switching protocol is SIP or a comparable protocol.

In Feature Processing FP of OSBiz, CSTA is connected via the component Application Interface API to Call Processing CP. The DSS server communicates with Call Processing CP using CSTA via middleware components CSP and the application interface API. The middleware components CSP can be one or more nodes (e.g. communication support processor node, communication node of a network, server, workstation, etc.) that each have at least one processor that executes middleware software stored on the node's non-transitory memory.

The LAN Device Handler (LDH) allows SIP endpoints to communicate with the platform via the SIP component SIP Stack Adapter SIP-SA. The SIP-SA communicates with the CP via the LAN Leg Control (LLC). The LAN Leg Control (LLC) manages the payload between LAN/LAN and LAN/TDM connections. CSTA support for SIP endpoints occurs via the 3rd-Party Call Control Interface PCC connected to the SIP-SA and the Application Interface. Not shown is a registration component (ERH), which communicates with the SIP component for the purpose of registering IP endpoints.

Figure 3:
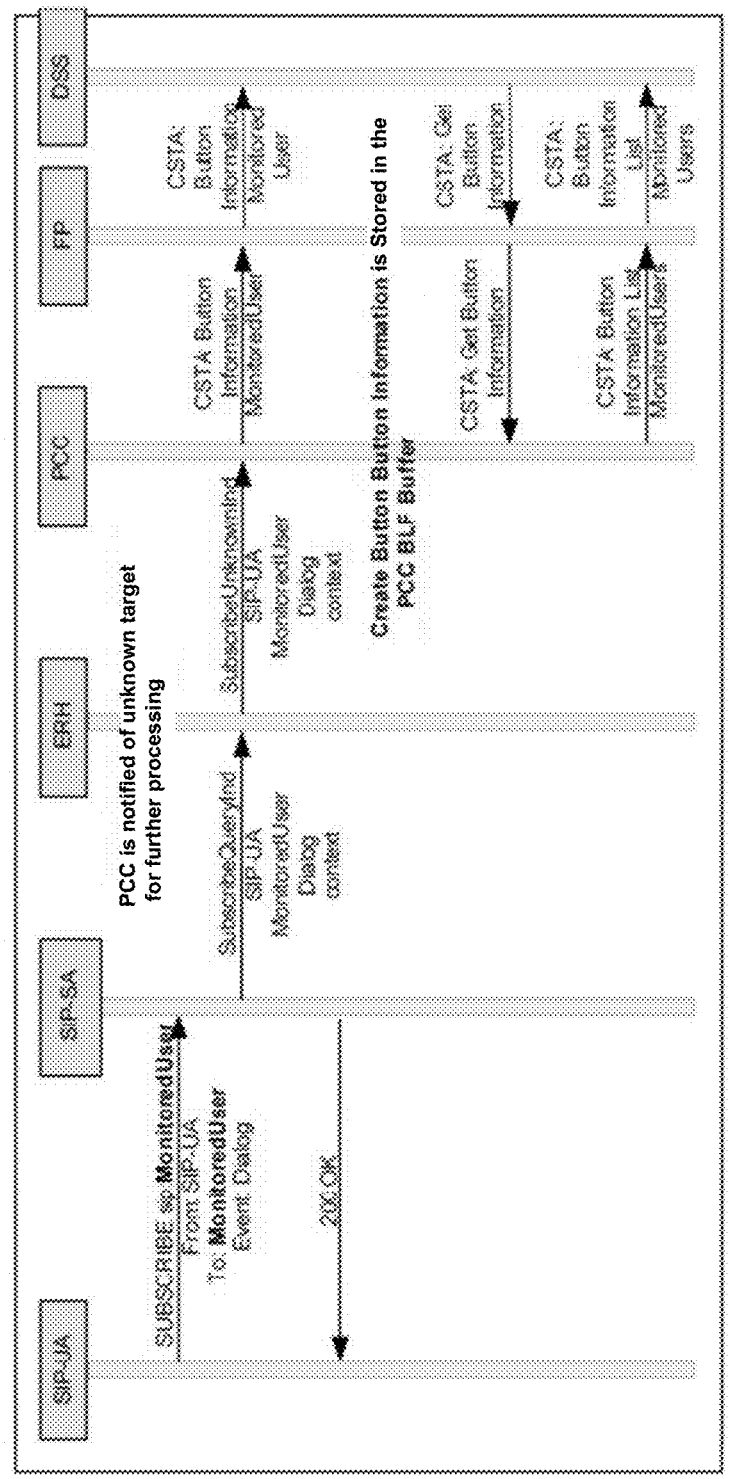
FIG. 3 is a simplified block diagram that presents schematically the registration for a call pickup across nodes for a method for establishing a telecommunication connection in a telecommunication system according to an exemplary embodiment of the invention.
Figure 4:
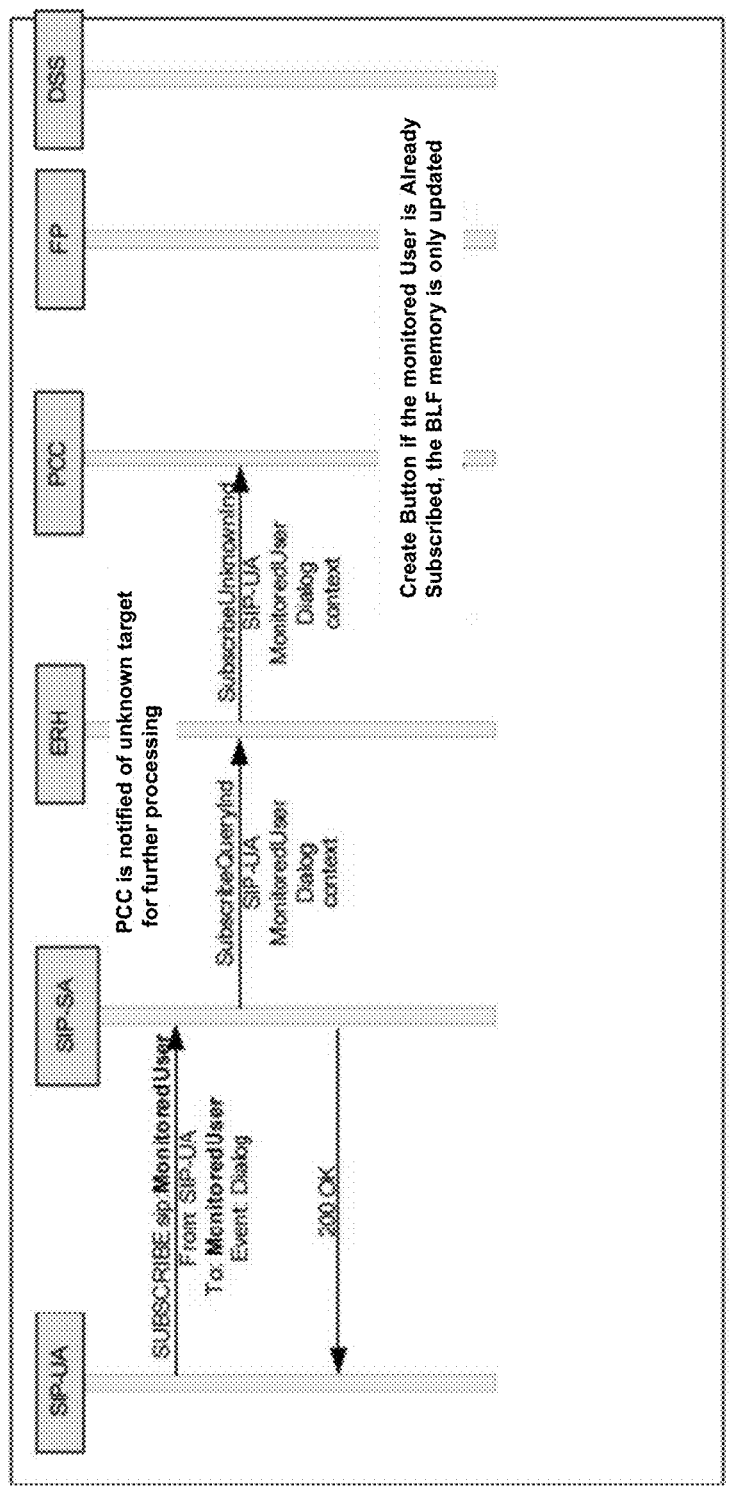
FIG. 4 is a simplified block diagram that presents schematically only one registration for each subscriber in the network to the DSS server for a call pickup across nodes for a method for establishing a telecommunication connection in a telecommunication system according to an exemplary embodiment of the invention.

In FIG. 3, a simplified block diagram shows schematically the registration for a call pickup across nodes for a method for establishing a telecommunication connection in a telecommunication system according to one exemplary embodiment.

The SIP endpoint registers its BLF button at the associated node using SIP: Subscribe. If the telephone number is not a target within this node, in the case of OSBiz the registration will be ignored or, optionally, refused.

Instead, the registration request is forwarded to the PCC component and, if it is a telephone number that can be called in the network, the BLF button is created by software (create button) and switched to the DSS server using CSTA: Button Information Event and is thus made known. The DSS server synchronizes using CSTA: GetButtonInformation and CSTA: ButtonInformationList.

Create Button: For synchronization and optimization purposes, the externally registered BLF targets are stored in the PCC component (3rd-Party Call Control Interface).

The switching states of the BLF targets are captured from the DSS server using CSTA: Call Control Events and converted to corresponding commands for the LED control using CSTA: SetLampMode, see FIG. 1. For the registered SIP endpoint this now means a conversion to a SIP: Notify in order to trigger the BLF button of the SIP endpoint.

According to one embodiment, only one registration for each subscriber of a network can be forwarded to the DSS server for each node instead of registering each BLF button individually. Additional registrations are stored preferably in the PCC component (Create Button) in order to trigger all local SIP endpoints by proxy in the case of a switching state signal.

The second terminal can thus be registered using a single registration at the central server to pick up a call directed to multiple first terminals. In this manner a group pickup across nodes is enabled, in particular for SIP endpoints, and SIP points can also register across nodes for the SIP endpoint feature "Group Call Pickup".

An example of call pickup across nodes shall now be described with reference to FIG. 1 and the tables presented below. If the subscriber D3 (first terminal) on the first switching node 10 is called by a third subscriber D4 (third terminal) on the third switching node 30, then signaling to the DSS server across nodes occurs via CSTA. Using CSTA: Delivered Events and the DSS buttons programmed at the terminals, the DSS server checks which LEDs shall be activated using CSTA: SetLampMode (1). In the case of SIP endpoints D1 and D2, this information for the BLF control needs to be converted to a SIP: Notify (2) through the PCC component.

If the SIP endpoint D1 (second subscriber) intends to pick up the call by pushing a button, the SIP endpoint D1 transmits a respective SIP: Invite. This generates a so-called "Call Leg" for the call pickup. The call pickup request from D1 can be identified as one across nodes through the PCC component (3rd Party Call Control Interface) and is forwarded to the DSS server using the CSTA: Button Press Event (4) by adding the call leg information.

The selected call (5) is now placed (6) by the DSS server on the third switching node 30, with little stress on the network resources, via the essentially known "single system image" method of the OSBiz by using the global parameter G1. The requesting call leg of the SIP endpoint is now transferred (7) transparently via the network protocol, with a prompt for automatic call pickup to node 1. In node 1, then, only the selected call of SIP endpoint A (8) is triggered and connected immediately (9). Thus, potential other call legs of the SIP endpoint are not taken into account in the assignment.

According to one exemplary embodiment, the method can also be applied to the feature of picking up calls by groups (group pickup across nodes). The difference is in the registration and the actual call pickup. In both cases, the respective SIP signal is presented on the SIP pickup as described above and converted correspondingly in the DSS server using CSTA.

The essential elements of the messages (1) to (10) are described in detail below in table form for one exemplary embodiment, where the general switching protocol is CSTA and the local switching protocol is SIP or a comparable protocol, wherein a call pickup across nodes to the central DSS server (DSS) occurs through a second terminal for a call directed by a third terminal to a first terminal.

Message (1): CSTA SetLampMode
is applied compliant with the protocol according to ECMA-269 Chapter 21.1.17 and used for controlling the LEDs of the associated DSS buttons.

Message (2): SIP NOTIFY
is applied compliant with the protocol and used to control the BLF.

Message (3): SIP INVITE
is applied compliant with the protocol and used to request the pickup. A call leg is generated.

Message (4): CSTA ButtonPressEvent
is applied in expanded form compliant with the protocol according to ECMA-269 Chapter 21.2.2 and used to identify the pickup request for the generated call leg.

Message (5): CSTA DirectedPickupCall
is applied from the perspective of the application (here: DSS server) according to ECMA-269 Chapter 17.1.13. However, conversion to the message (6) is already commercially available inside OpenScape Business.

Message (6): CSTA DeflectCall
is applied in expanded form compliant with the protocol according to ECMA-269 Chapter 17.1.11 and used to forward the call directly from the node of the caller to the node of the recipient with little stress on the resources. The already commercially available indication of the immediate call accept (autoAnswer) provides direct switching of the call. Preferably, indication of the call leg occurs in addition.

Message (7): SIP-Q Setup
includes, in addition to addressing the SIP device, also the autoAnswer and call leg indication.

Message (8): Call Processing Linking Call Leg
is a purely proprietary system-internal message, which now, however, fulfills the response to message (3) by applying the call leg.

Message (9): SIP 200 OK
is applied compliant with the protocol using the autoAnswer option and used to switch the call automatically.

Message (10): CorNet-NQ Connect
includes, as previously compliant with the protocol, the logic device in the connected number.

Finally, the tables presented on the two pages below are used to explain the CSTA and SIP message occurrence based on the known 'single system image' of an OSBiz, where the local call ID is modulated by the global call ID through the middleware according to another exemplary embodiment.

| Messages (see Chapter 3) | SIP Endpoint A Device D1 | SIP Endpoint B Device D2 | Tin C Device D3 | Tin X Device D4 | Comment/Action |
|---|---|---|---|---|---|
| | | | | | Typical signaling for calls across networks |
| CSTA: DeliveredEvent | | | | | |
| connection | | | D3G1 | D3G1 | CSTA: Delivered Event Tin X calls Tin C |
| alertingDevice | | | D3 | D3 | |
| callingDevice | | | D4 | D4 | |
| calledDevice | | | D3 | D3 | |

-continued

| Messages (see Chapter 3) | SIP Endpoint A Device D1 | SIP Endpoint B Device D2 | Tin C Device D3 | Tin X Device D4 | Comment/Action | |
|---|---|---|---|---|---|---|
| CSTA: SetLampModeRequest (1) | | | | | | |
| device | D1 | D2 | | | DSS server switches the LED to flash | CSTA |
| lamp | ID | ID | | | | ↓ |
| lampMode | wink | wink | | | optional: Optimized for only one registration per node | SIP |
| CSTA: SetLampModeResult SIP: NOTIFY (2) | | | | | | |
| from | BLF User | BLF User | | | BLF signaling at the SIP endpoints A and B | |
| dialog-info | <state>early | <state>early | | | | |
| SIP: INVITE (3) | | | | | | |
| from | D1 | | | | Call pickup through SIP endpoints A on Call Leg 1 | SIP |
| to | Pickup D3 | | | | | ↓ |
| | | | | | | CSTA |
| CSTA: ButtonPressEvent (4) | | | | | | |
| device | D1 | | | | | |
| button | ID | | | | | |
| privateData callLeg | Call Leg 1 | | | | | |
| CSTA: Directed PickupCallRequest (5) | | | | | | |
| callToBePickedUp | D3G1 | | | | DSS-server recognizes Pick-Up request and dispatches the respective CSTA Pickup command. | |
| newDestination | D1 | | | | | |
| privateData callLeg | Call Leg 1 | | | | | |
| CSTA: DirectedPickupCallResult | | | | | | |
| pickedCall | D1G1 | | | | | |
| CSTA: DeflectCallRequest (6) | | | | | | |
| callToBeDiverted | | | N6C1 | | Conversion of the CSTA Pick-Up command to the "single system image" using the middleware on the local node of Tin X | |
| newDestination | | | D1 | | | |
| privateData | | | True | | | |
| autoAnswer | | | Call Leg 1 | | | |
| callLeg | | | | | | |
| CSTA: DeflectCallResult (7) | | | | | The SIP-Q setup with request for automatic call accept by SIP endpoint A is transmitted to node 1. Call Leg 1 is transparently passed through in this case. | |
| CSTA: DivertedEvent | | | | | | |
| divertingConnection | | D3G1 | D3G1 | | CSTA: Call was forwarded to SIP endpoint A | |
| divertingDevice | | D3 | D3 | | | |
| newDestination | | D1 | D1 | | | |
| SIP: 200 OK | | | | | | |
| from | D3 | | | | Call Leg 1 is used to identify the call at SIP endpoint A. SIP-Q Connect for automatic call acceptance is transmitted to Tin X | |
| to | D1 | | | | | |
| (8) | | | | | | |
| CSTA: EstablishedEvent | | | | | | |
| establishedConnection | D1G1 | | D1G1 | | CSTA: Call was accepted by SIP endpoint A | |
| answeringDevice | D1 | | D1 | | | |
| callingDevice | D4 | | D4 | | | |
| calledDevice | D3 | | D3 | | | |

Typically, SIP endpoints register via SIP: Subscribe for a feature at their assigned OSBiz node. Traditionally, the initiator and the target need to be registered at the same OSBiz nodes in case of a call pickup. If this is the case, OSBiz can notify the initiator of the switching changes using SIP: Notify. When applied, the SIP endpoint can trigger a call the OSBiz compliant with the protocol at the target using a functional sequence in the SIP protocol (here SIP: Invite) and accept the call.

For the pickup in the network, OSBiz, for example, currently already provides a DSS server. The DSS server uses CSTA in order to control the pickup when networking the OSBiz.

In particular, the invention allows for converting the SIP registration of targets remote from the node suitably into CSTA and forwarding it to the DSS server. With the registration completed, the DSS server is enabled to forward the switching states of the target remote from the node to the initiator and carry out the pickup request of the SIP endpoint. To this end, a conversion of the functional SIP protocol, for example to the essentially known stimulus properties of the OSBiz system terminals (UP0/E and HFA), occurs preferably using selected CSTA services and CSTA events. This includes the broadcast capability, i.e., the registration for each target for each OSBiz node at the DSS server is sufficient to select the same target for multiple initiators.

It should be noted that the features of the invention described by referencing the presented embodiments, for example the type and configuration of the messages, protocols and other details, can also be present in other embodiments, unless stated otherwise or prohibited for technical reasons. Not all features of individual embodiments described in combination must necessarily always be implemented in any one particular embodiment.

The invention claimed is:

1. A method for establishing a telecommunication connection, comprising:
assigning a first terminal to a first switching node and assigning a second terminal to another, second switching node,
registering the second terminal via a registration at a central Direct Station Selection (DSS) server using a general switching protocol, wherein the registration of the second terminal is provided in a local protocol for call pickup and transferred into the general switching protocol and forwarded to the central DSS server, and
a local server checking during the registration of the first terminal for a call pickup by the second terminal to see whether the second terminal is assigned to the same switching node, and, upon a determination that this is not the case, the local server performing the registering of the second terminal at the central DSS server;
after the registering of the second terminal, directing the pickup of the call by a third terminal to the first terminal so that the pickup of the call occurs through the second terminal across nodes by using the general switching protocol so that the call is directed to the second terminal to be picked up at the second terminal instead of the first terminal while other call legs for the call pickup are not taken into account in the directing of the pickup of the call by the second terminal.

2. The method of claim 1, further comprising capturing by the central DSS server a call directed from the third terminal to the first terminal and transmitting a respective message from the central DSS server to the local server of the switching node of the second terminal and signaling the second terminal in response to determining that the second terminal is registered to pickup a call directed to the first terminal.

3. The method of claim 1, further comprising registering multiple terminals as a call pickup group at the central DSS server with one single registration as a second terminal for picking up a call directed from the third terminal to the first terminal.

4. The method of claim 1, further comprising registering at the central DSS server the second terminal with one single registration for picking up calls directed to multiple terminals.

5. The method of claim 1, wherein Computer Supported Telecommunications Applications (CSTA) is the general switching protocol, and Session Initiation Protocol (SIP) is the local switching protocol, further comprising activating "CSTA: SetLampMode" at the second terminal by the central DSS server based on "CSTA: Delivered Events" when a call is directed from the third terminal to the first terminal, signaling for call pickup through the second terminal and the activating occurs via CSTA across switching nodes.

6. The method of claim 5, wherein the second terminal is a SIP endpoint and the call directed from the third terminal to the first terminal is signaled at the second terminal using "SIP: Notify" and is picked up using "SIP: Invite".

7. The method of claim 1, wherein the directing of the pickup of the call by the third terminal to the first terminal occurring through the second terminal across nodes by using the general switching protocol comprises: registering the second terminal for a call number of the first terminal such that the second switching node forwards a registration of the second terminal to the central DSS server such that the call directed from the third terminal to the first terminal is answerable at the second terminal via the DSS server placing the call on the second switching node as a result of the registering of the second terminal: after the second terminal is registered with the DSS server, answering the call directed from the third terminal to the first terminal via a pickup of the call at the second terminal such that the call is picked up by the second terminal instead of the first terminal.

8. The method of claim 7, wherein the registering of the second terminal for the call number of the first terminal such that the second switching node forwards the registration of the second terminal to the central DSS server such that the call directed from the third terminal to the first terminal is answerable at the second terminal via the DSS server placing the call on the second switching node as a result of the registering of the second terminal comprises: the second switching node forwarding a registration of the second terminal to the central DSS server to facilitate registration of the second terminal with the central DSS server so that registering of a busy lamp field (BLF) button of the second terminal for the call number of the first terminal as a BLF target for the BLF button Is transmitted to the central DSS server so that switching states of the BLF target are capturable from the central DSS server to trigger the BLF button of the second terminal in response to detection of the call directed from the third terminal to the first terminal and the central DSS server placing the call onto the second switching node of the second terminal to facilitate pickup of the call at the second terminal instead of at the first terminal.

9. The method of claim 8, wherein the local protocol is a Session Initiation Protocol.

10. The method of claim 9, wherein the general switching protocol is a Computer Supported Telecommunications Applications protocol.

11. The method of claim 8, comprising storing the registration of the second terminal in a third party call control interface component.

12. The method of claim 11, wherein the first terminal, second terminal, DSS server, first switching node and second switching node are within a local area network and the third party call control interface component is a component of a local area network handler of the local area network.

13. The method of claim 12, wherein the local area network handler is configured to facilitate communication between the second terminal and the DSS server via a Session Initiation Protocol stack adapter.

14. The method of claim 13, wherein the first switching node is connected to the second switching node via at least one network trunk.

15. The method of claim 12, wherein the first switching node is connected to the second switching node via at least one network trunk.

16. A non-transitory computer readable storage medium containing instructions that are executable by at least one of a server and a terminal in a communications system, the instructions defining a method implemented by the server or the terminal that executes the instructions stored in the non-transitory computer readable storage medium, the method comprising:
assigning a first terminal to a first switching node and assigning a second terminal to another, second switching node,
registering the second terminal for a call number of the first terminal such that the second switching node forwards a registration of the second terminal to a central Direct Station Selection (DSS) server such that the call directed from a third terminal to the first terminal is answerable at the second terminal via the DSS server as a result of the registering of the second terminal, wherein the registration of the second terminal provided in a local protocol for call pickup is transferred into a general switching protocol and forwarded to the central DSS server for registering the second terminal with the central DSS server;
checking during the registration of the first terminal for a call pickup by the second terminal to see whether the second terminal is assigned to the same switching node, and, upon a determination that this is not the case, performing the registering of the second terminal at the central DSS server;
after the second terminal is registered with central the DSS server, answering the call directed from the third terminal to the first terminal via a pickup of the call at the second terminal such that the call is picked up by the second terminal instead of the first terminal via use of the general switching protocol while other call legs for the call pickup are not taken into account in the directing of the pickup of the call at the second terminal.

17. The non-transitory computer readable storage medium of claim 16, wherein the registering of the second terminal for the call number of the first terminal such that the second switching node forwards a registration of the second terminal to the central DSS server such that the call directed from the third terminal to the first terminal is answerable at the second terminal via the DSS server as a result of the registering of the second terminal comprises:
registering a busy lamp field (BLF) button of the second terminal for the call number of the first terminal as a BLF target for the BLF button so that switching states of the BLF target are capturable from the central DSS server to trigger the BLF button of the second terminal in response to detection of the call directed from the third terminal to the first terminal via the central DSS server placing the call onto the second switching node to facilitate pickup of the call at the second terminal instead of at the first terminal.

18. A telecommunication system, comprising:
multiple switching nodes, each switching node having a respective local server and associated terminals arranged in a network, the switching nodes comprising a first switching node and a second switching node, a first terminal assigned to a first switching node and a second terminal assigned to a second switching node; and
a central Direct Station Selection (DSS) server for controlling the telecommunication system using a general switching protocol,
wherein terminals of a switching node are controlled by the local server of that switching node using a local protocol comprising control commands for node-internal call pickup between terminals registered within the switching node for call pickup,
the central DSS server and the multiple switching nodes being located within the network and are provided to transfer the control commands provided in a local protocol for picking up calls in the general switching protocol and providing them to the multiple switching nodes located across nodes within the network through the central DSS server via registration of a terminal provided in the local protocol for call pickup being transferred into the general switching protocol and forwarded to the central DSS server such that a telecommunication connection for a call directed from a third terminal to the first terminal assigned to the first switching node is establishable at the second terminal instead of the first terminal via a pickup of the call at the second terminal via the central DSS server responding to detection of the call by adding a call leg to the call to place the call onto the second switching node while other call legs for the call pickup are not taken into account based on a prior registration of the second terminal with the central DSS server;
a local server configured to check during the registration of the first terminal for a call pickup by the second terminal to see whether the second terminal is assigned to the same switching node, and, upon a determination that this is not the case, the local server performing the registering of the second terminal at the central DSS server.

19. The telecommunication system of claim 18, wherein the second switching node is configured to forward a registration of the second terminal to the central DSS server to facilitate the prior registration of the second terminal with the central DSS server so that registering of a busy lamp field (BLF) button of the second terminal for a call number of the first terminal as a BLF target for the BLF button is transmitted to the central DSS server so that switching states of the BLF target are capturable from the central DSS server to trigger the BLF button of the second terminal in response to detection of the call directed from the third terminal to the first terminal via the central DSS server placing the call onto the second switching node to facilitate pickup of the call at the second terminal instead of at the first terminal.

* * * * *